United States Patent
Togashi et al.

(10) Patent No.: US 7,589,953 B2
(45) Date of Patent: Sep. 15, 2009

(54) MULTILAYER CAPACITOR

(75) Inventors: Masaaki Togashi, Chuo-ku (JP); Takashi Aoki, Chuo-ku (JP); Hiroshi Abe, Nikaho (JP); Hiroshi Okuyama, Chuo-ku (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

(21) Appl. No.: 12/267,868

(22) Filed: Nov. 10, 2008

(65) Prior Publication Data

US 2009/0135543 A1 May 28, 2009

(30) Foreign Application Priority Data

Nov. 26, 2007 (JP) .......................... P2007-305025

(51) Int. Cl.
*H01G 4/228* (2006.01)

(52) U.S. Cl. .............. 361/306.3; 361/306.1; 361/321.1; 361/321.2; 361/307; 361/308.1

(58) Field of Classification Search ............. 361/306.3, 361/306.1, 303–305, 307, 308.1, 309, 311–313, 361/321.1, 321.2
See application file for complete search history.

(56) References Cited

U.S. PATENT DOCUMENTS

| | | | | |
|---|---|---|---|---|
| 6,370,010 B1 * | 4/2002 | Kuroda et al. | ............ | 361/306.1 |
| 6,606,237 B1 * | 8/2003 | Naito et al. | ............ | 361/306.3 |
| 6,700,772 B2 * | 3/2004 | Raghavendra et al. | .... | 361/321.2 |
| 6,819,543 B2 * | 11/2004 | Vieweg et al. | ............ | 361/306.3 |
| 6,934,145 B2 * | 8/2005 | Hsieh et al. | ............... | 361/321.2 |
| 6,940,710 B1 * | 9/2005 | Lee et al. | .................. | 361/321.2 |
| 7,277,270 B2 * | 10/2007 | Sato et al. | ................. | 361/321.1 |
| 2007/0070577 A1 | 3/2007 | Togashi | | |
| 2007/0109717 A1 | 5/2007 | Lee et al. | | |
| 2007/0247783 A1 | 10/2007 | Shimizu et al. | | |

FOREIGN PATENT DOCUMENTS

| | | |
|---|---|---|
| EP | 1 659 597 | 5/2006 |
| JP | 11-016776 | 1/1999 |
| JP | 2000-228640 | 8/2000 |
| JP | 2002-228329 | 8/2000 |

* cited by examiner

*Primary Examiner*—Nguyen T Ha
(74) *Attorney, Agent, or Firm*—Drinker Biddle & Reath LLP (57) ABSTRACT

A multilayer capacitor has a first inner electrode connected to a first terminal electrode, a second inner electrode connected to a second terminal electrode, and third and fourth inner electrodes connected to third and fourth terminal electrodes. The first and second inner electrodes have no overlapping area therebetween when seen in the opposing direction of the first and second main faces and are arranged at respective positions different from each other in the opposing direction of the first and second main faces and in the opposing direction of the first and second side faces. The third and fourth inner electrodes have no overlapping area therebetween when seen in the opposing direction of the first and second main faces and are arranged at respective positions different from each other in the opposing direction of the first and second main faces and in the opposing direction of the first and second side faces. The first and third inner electrodes have an overlapping area therebetween when seen in the opposing direction of the first and second main faces. The second and fourth inner electrodes have an overlapping area therebetween when seen in the opposing direction of the first and second main faces.

4 Claims, 6 Drawing Sheets

ated with each other in the opposing direction of the first and second main faces; a first terminal electrode arranged on the first side face of the capacitor element body; a second terminal electrode arranged on the second side face of the capacitor element body; a third terminal electrode arranged on the third side face of the capacitor element body; a fourth terminal electrode arranged on the fourth side face of the capacitor element body; a first inner electrode connected to the first terminal electrode and arranged within the capacitor element body; a second inner electrode connected to the second terminal electrode and arranged within the capacitor element body; and third and fourth inner electrodes connected to the third and fourth terminal electrodes and arranged within the capacitor element body; wherein the first and second inner electrodes have no overlapping area therebetween when seen in the opposing direction of the first and second main faces and are arranged at respective positions different from each other in the opposing direction of the first and second main faces and in the opposing direction of the first and second side faces; wherein the third and fourth inner electrodes have no overlapping area therebetween when seen in the opposing direction of the first and second main faces and are arranged at respective positions different from each other in the opposing direction of the first and second main faces and in the opposing direction of the first and second side faces; wherein the first and third inner electrodes have an overlapping area
MULTILAYER CAPACITOR

BACKGROUND OF THE INVENTION

1. Field of the Invention

The present invention relates to a multilayer capacitor.

2. Related Background Art

For noise suppression in a two-line transmission line, it has been known to insert a capacitor between each line and the ground (see, for example, Japanese Patent Application Laid-Open No. 2000-228640).

SUMMARY OF THE INVENTION

When a multilayer capacitor is used as a capacitor inserted between each line and the ground, two multilayer capacitors are necessary in general. This makes it necessary for a circuit board or the like to secure an area for mounting the two multilayer capacitors, which becomes a great constraint in designing the circuit board or the like.

For reducing the mounting area of multilayer capacitors, two multilayer capacitors may be fabricated into a single chip, so as to be made smaller. When the two multilayer capacitors are fabricated into a single chip, i.e., when two capacitors are formed within a single multilayer capacitor, however, crosstalk is easier to occur between the capacitors. When the crosstalk occurs, it becomes difficult for the multilayer capacitor to absorb noises sufficiently.

It is an object of the present invention to provide a multilayer capacitor which is formed with two capacitors and can restrain crosstalk from occurring, while being made smaller.

The multilayer capacitor in accordance with the present invention comprises a capacitor element body having rectangular first and second main faces opposing each other, first and second side faces extending in a short side direction of the first and second main faces so as to connect the first and second main faces to each other and opposing each other, and third and fourth side faces extending in a longer side direction of the first and second main faces so as to connect the first and second main faces to each other and opposing each other, the capacitor element body including a plurality of insulator layers laminated in the opposing direction of the first and second main faces; a first terminal electrode arranged on the first side face of the capacitor element body; a second terminal electrode arranged on the second side face of the capacitor element body; a third terminal electrode arranged on the third side face of the capacitor element body; a fourth terminal electrode arranged on the fourth side face of the capacitor element body; a first inner electrode connected to the first terminal electrode and arranged within the capacitor element body; a second inner electrode connected to the second terminal electrode and arranged within the capacitor element body; and third and fourth inner electrodes connected to the third and fourth terminal electrodes and arranged within the capacitor element body; wherein the first and second inner electrodes have no overlapping area therebetween when seen in the opposing direction of the first and second main faces and are arranged at respective positions different from each other in the opposing direction of the first and second main faces and in the opposing direction of the first and second side faces; wherein the third and fourth inner electrodes have no overlapping area therebetween when seen in the opposing direction of the first and second main faces and are arranged at respective positions different from each other in the opposing direction of the first and second main faces and in the opposing direction of the first and second side faces; wherein the first and third inner electrodes have an overlapping area therebetween when seen in the opposing direction of the first and second main faces; and wherein the second and fourth inner electrodes have an overlapping area therebetween when seen in the opposing direction of the first and second main faces.

In the multilayer capacitor in accordance with the present invention, the first and third inner electrodes form one capacitor, while the second and fourth inner electrodes form another capacitor. Hence, two capacitors are formed within a single capacitor element body. The third and fourth terminal electrodes are shared by the two capacitors. As a result, the multilayer capacitor can be made much smaller.

In the present invention, the first and third inner electrodes forming one capacitor are arranged such as to have no overlapping areas with, i.e., not to overlap, the second and fourth inner electrodes forming the other capacitor when seen in the opposing direction of the first and second main faces. Therefore, crosstalk can be restrained from occurring between the two capacitors. In particular, the first and second inner electrodes are arranged at respective positions different from each other in the opposing direction of the first and second main faces and in the opposing direction of the first and second side faces, while the third and fourth inner electrodes are arranged at respective positions different from each other in the opposing direction of the first and second main faces and in the opposing direction of the first and second side faces. Therefore, the gap between the first and second inner electrodes and the gap between the third and fourth inner electrodes are large, whereby the occurrence of crosstalk can further be suppressed.

Preferably, the first and fourth inner electrodes are arranged at the same position in the opposing direction of the first and second main faces while having a predetermined gap therebetween in the opposing direction of the first and second side faces, whereas the second and third inner electrodes are arranged at the same position in the opposing direction of the first and second main faces while having a predetermined gap therebetween in the opposing direction of the first and second side faces. In this case, the total number of inner electrodes laminated for yielding a desirable capacitance is smaller in each of the resulting capacitors, whereby the multilayer capacitor (capacitor element body) can achieve a lower profile.

Preferably, the third inner electrode has two lead portions extending from an end portion on the second side face side to the third and fourth side faces, respectively; the fourth inner electrode has two lead portions extending from an end portion on the first side face side to the third and fourth side faces, respectively; the first inner electrode is kept from overlapping an area positioned between the two lead portions in the third inner electrode in the opposing direction of the third and fourth side faces when seen in the opposing direction of the first and second main faces; and the second inner electrode is kept from overlapping an area positioned between the two lead portions in the fourth inner electrode in the opposing direction of the third and fourth side faces when seen in the opposing direction of the first and second main faces. In this case, the gap between the first and second inner electrodes is made much greater, whereby the occurrence of crosstalk can be suppressed more effectively.

The present invention can provide a multilayer capacitor which is formed with two capacitors and can restrain crosstalk from occurring, while being made smaller.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, a preferred embodiment of the present invention will be explained in detail with reference to the accompanying drawings. In the explanation, the same constituents or those having the same functions will be referred to with the same numerals or letters while omitting their overlapping descriptions.

Figure 1:
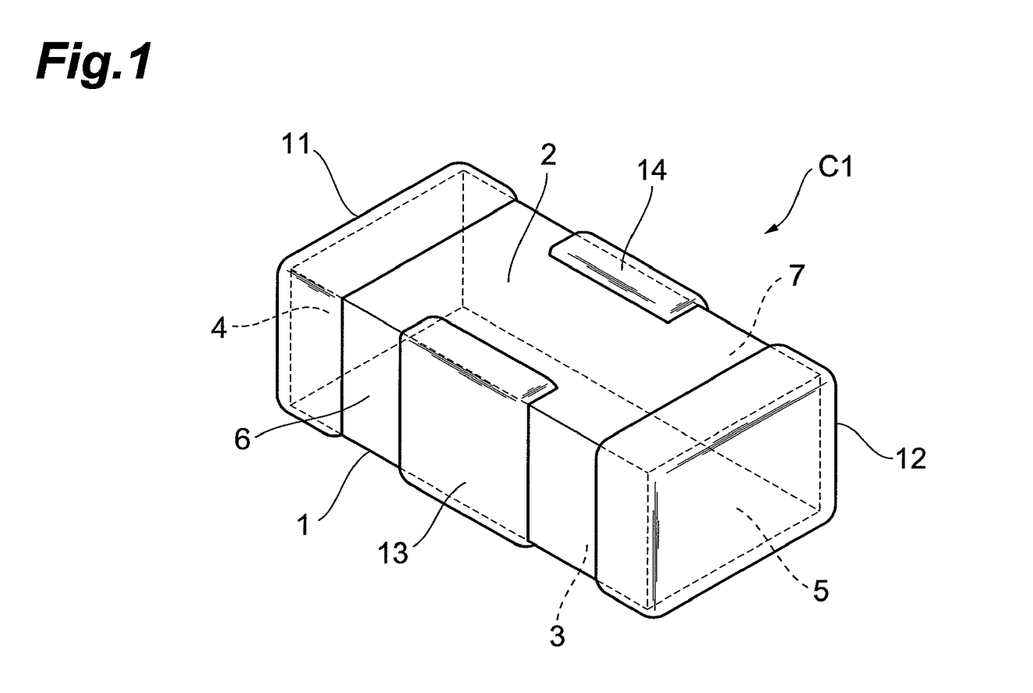
FIG. 1 is a perspective view of the multilayer capacitor in accordance with an embodiment.
Figure 2:
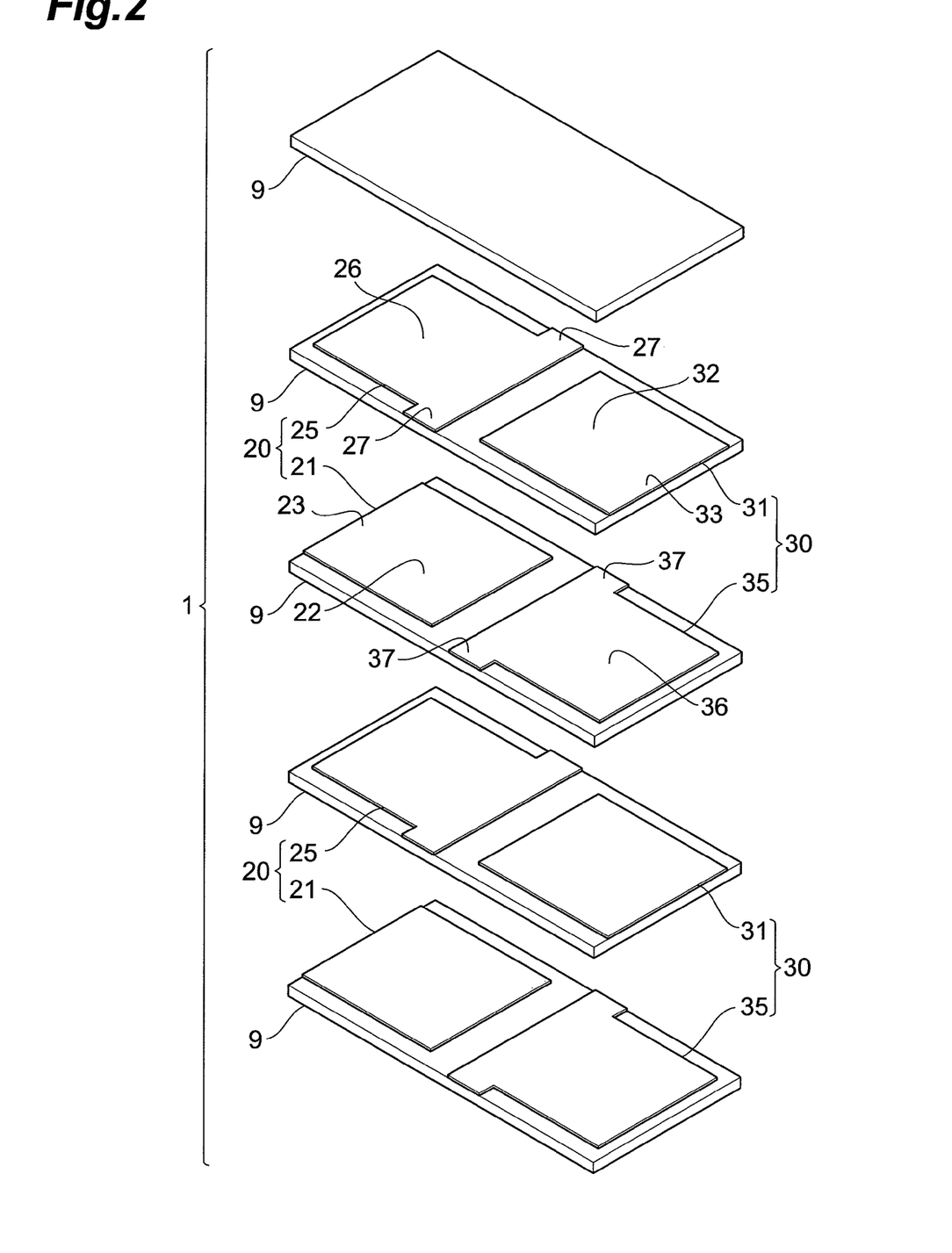
FIG. 2 is an exploded perspective view of a capacitor element body included in the multilayer capacitor in accordance with the embodiment.
Figure 3:
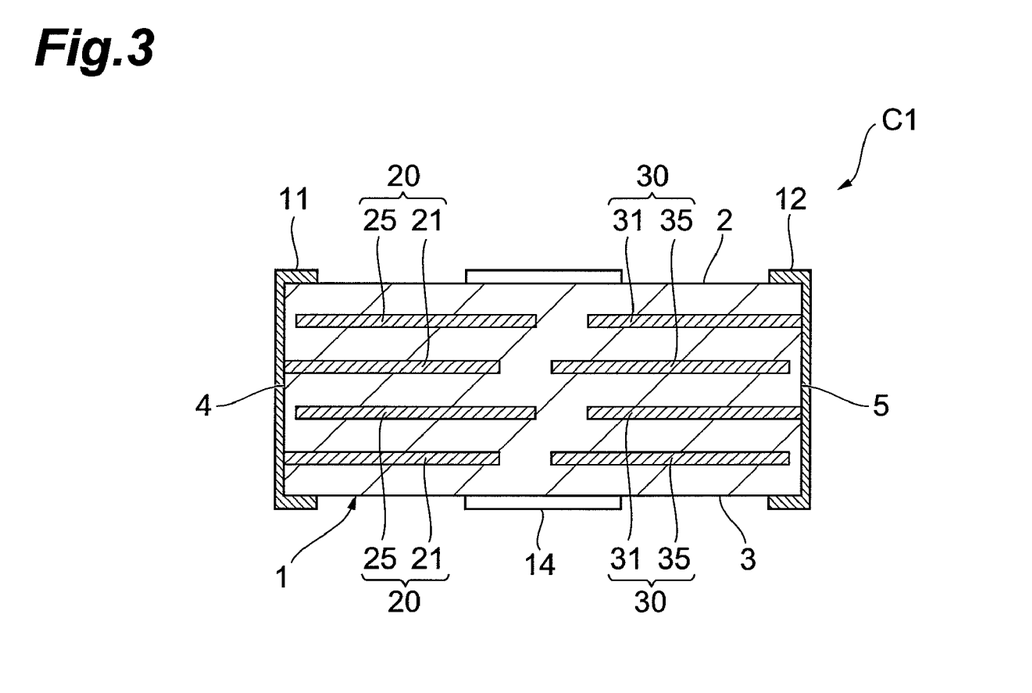
FIG. 3 is a view showing a cross-sectional structure of the multilayer capacitor in accordance with the embodiment.
Figure 4:
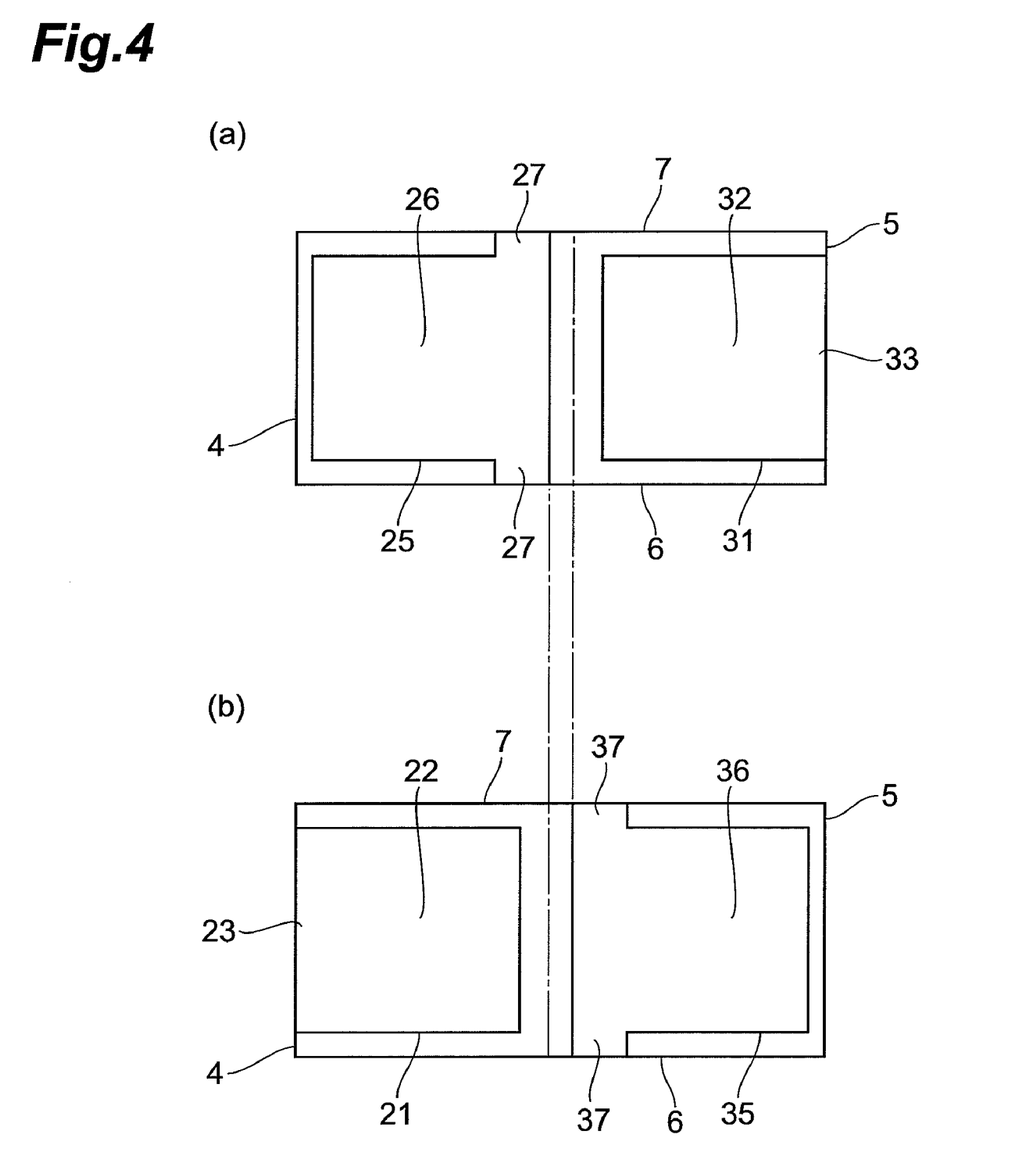
FIG. 4 is a view showing structures of inner electrodes.
Figure 5:
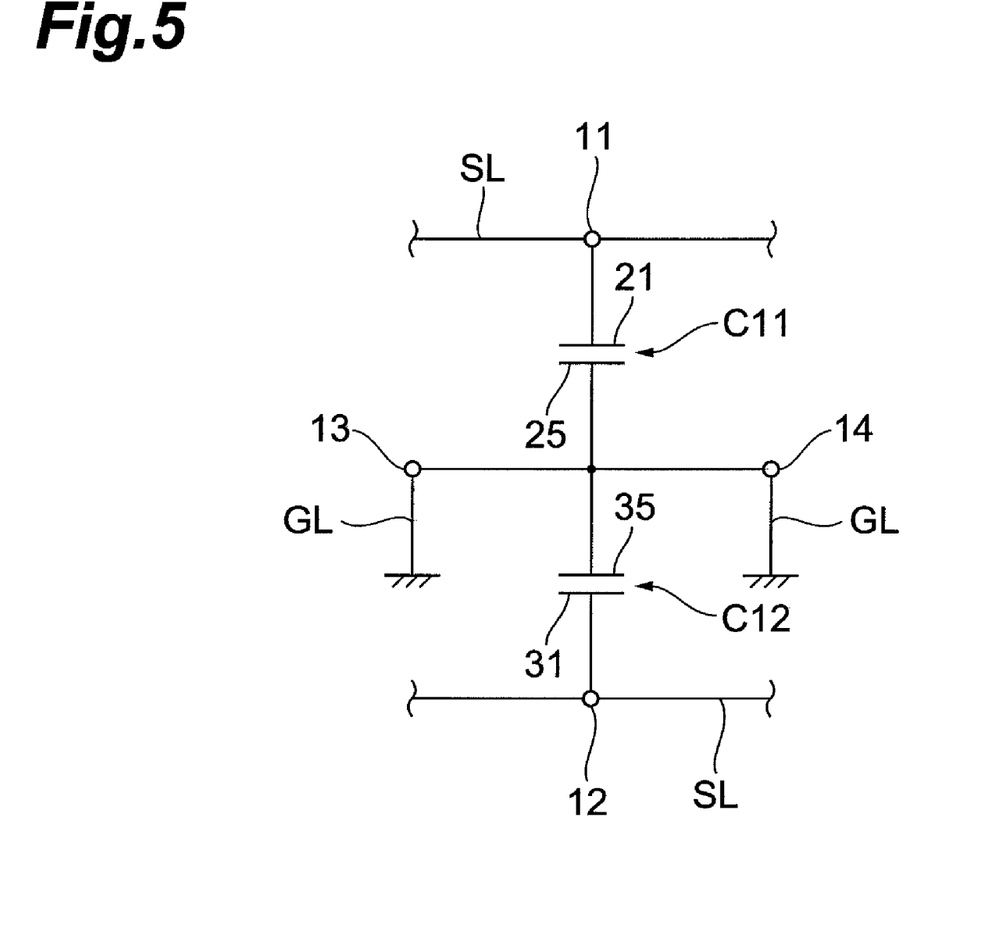
FIG. 5 is an equivalent circuit diagram of the multilayer capacitor in accordance with the embodiment.

Referring to FIGS. 1 to 5, the structure of a multilayer capacitor C1 in accordance with this embodiment will be explained. FIG. 1 is a perspective view of the multilayer capacitor in accordance with the embodiment. FIG. 2 is an exploded perspective view of a capacitor element body included in the multilayer capacitor in accordance with the embodiment. FIG. 3 is a view showing a cross-sectional structure of the multilayer capacitor in accordance with the embodiment. FIG. 4 is a view showing structures of inner electrodes. FIG. 5 is an equivalent circuit diagram of the multilayer capacitor in accordance with the embodiment.

The capacitor element body 1, which is shaped like a substantially rectangular parallelepiped, has first and second main faces 2, 3, first and second side faces 4, 5, and third and fourth side faces 6, 7. The first and second main faces 2, 3, each of which has a substantially rectangular form, oppose each other. The first and second side faces 4, 5 extend in the shorter side direction of the first and second main faces 2, 3 so as to connect the first and second main faces 2, 3 to each other, while opposing each other. The third and fourth side faces 6, 7 extend in the longer side direction of the first and second main faces 2, 3 so as to connect the first and second main faces 2, 3 to each other, while opposing each other. The first main face 2 or second main face 3 becomes a mounting surface for other components (e.g., circuit boards and electronic components).

As shown in FIG. 2, the capacitor element body 1 has a plurality of insulator layers 9. The capacitor element body 1 is constructed by laminating the plurality of insulator layers 9 in the opposing direction of the first and second main faces 2, 3 and has a dielectric characteristic. Each insulator layer 9 is constituted by a sintered body of a ceramic green sheet containing a dielectric ceramic (such as one based on $BaTiO_3$, $Ba(Ti, Zr)O_3$, or $(Ba, Ca)TiO_3$, for example. In the actual multilayer capacitor C1, the insulator layers 9 are integrated to such an extent that their boundaries are indiscernible.

A first terminal electrode 11 is arranged on the first side face 4 of the capacitor element body 1. The first terminal electrode 11 is formed on end portions (on the first side face 4 side) of the first and second main faces 2, 3 and third and fourth side faces 6, 7 so as to cover the whole first side face 4. A second terminal electrode 12 is arranged on the second side face 5 of the capacitor element body 1. The second terminal electrode 12 is formed on end portions (on the second side face 5 side) of the first and second main faces 2, 3 and third and fourth side faces 6, 7 so as to cover the whole second side face 5. The first terminal electrode 11 and second terminal electrode 12 oppose each other in the opposing direction of the first and second side faces 4, 5.

A third terminal electrode 13 is arranged on the third side face 6 of the capacitor element body 1. The third terminal electrode 13 is formed so as to extend to the first and second main faces 2, 3 while covering a portion of the third side face 6 along the opposing direction of the first and second main faces 2, 3. The third terminal electrode 13 is positioned on the third side face 6 substantially at the center in the opposing direction of the first and second side faces 4, 5.

A fourth terminal electrode 14 is arranged on the fourth side face 7 of the capacitor element body 1. The fourth terminal electrode 14 is formed so as to extend to the first and second main faces 2, 3 while covering a portion of the fourth side face 7 along the opposing direction of the first and second main faces 2, 3. The fourth terminal electrode 14 is positioned on the fourth side face 7 substantially at the center in the opposing direction of the first and second side faces 4, 5. The fourth terminal electrode 14 opposes the third terminal electrode 13 in the opposing direction of the third and fourth side faces 6, 7.

The terminal electrodes 11 to 14 are formed by applying and sintering a conductive paste containing a conductive metal powder and glass frit onto their corresponding outer surfaces of the capacitor element body 1, for example. Plating layers may be formed on the sintered terminal electrodes 11 to 14 when necessary.

As shown in FIGS. 2 and 3, the multilayer capacitor C1 comprises first inner electrode groups 20 and second inner electrode groups 30. Each first inner electrode group 20 includes a first inner electrode 21 and a third inner electrode 25. Each second inner electrode group 30 includes a second inner electrode 31 and a fourth inner electrode 35. The first to fourth inner electrodes 21, 25, 31, 35 are arranged within the capacitor element body 1.

The capacitor element body 1 includes an area arranged with the first inner electrode groups 20 and an area arranged with the second inner electrode groups 30, while these areas are placed in a row along the opposing direction of the first and second side faces 4, 5. Hence, each pair of the first and second inner electrode groups 20, 30 are placed in a row along the opposing direction of the first and second side faces 4, 5 within the capacitor element body 1. Specifically, the first inner electrode groups 20 are arranged on the first side face 4 side, while the second inner electrode groups 30 are arranged on the second side face 5 side.

The first to fourth inner electrodes 21, 25, 31, 35 are constituted by a conductive material (e.g., Ni which is a base metal) typically used as an inner electrode of multilayer electric devices. The first to fourth inner electrodes 21, 25, 31, 35 are constructed as sintered bodies of a conductive paste containing the conductive material.

As also shown in (b) of FIG. 4, the first inner electrode 21 exhibits a rectangular form, and has a main electrode portion 22 and a lead portion 23. The main electrode portion 22 and lead portion 23 are formed integrally with each other. The lead portion 23 extends from an edge of the main electrode portion 22 on the first side face 4 side so as to expose an end at the first side face 4.

The first terminal electrode 11 is formed such as to cover the whole exposed portion of the lead portion 23 on the first side face 4. The lead portion 23 is connected to the first terminal electrode 11 physically and electrically. As a consequence, the first inner electrode 21 is connected to the first terminal electrode 11.

As also shown in (a) of FIG. 4, the third inner electrode 25 has a main electrode portion 26 exhibiting a rectangular form and two lead portions 27. The main electrode portion 26 is integrally formed with the lead portions 27. One lead portion 27 extends from an end portion of the main electrode portion 26 on the second side face 5 side to the third side face 6 so as to expose an end at the third side face 6. The other lead portion 27 extends from an end portion of the main electrode portion 26 on the second side face 5 side to the fourth side face 7 so as to expose an end at the fourth side face 7.

The third and fourth terminal electrodes 13, 14 are formed such as to cover all the exposed portions of the lead portions 27 on the third and fourth side faces 6, 7, respectively. The lead portions 27 are connected to their corresponding third and fourth terminal electrodes 13, 14 physically and electrically. As a consequence, the third inner electrode 25 is connected to the third and fourth terminal electrodes 13, 14.

The main electrode portion 22 of the first inner electrode 21 and the main electrode portion 26 of the third inner electrode 25 include respective areas opposing each other in the laminating direction of the insulator layers 9 (the opposing direction of the first and second main faces 2, 3) while interposing therebetween at least one insulator layer 9 which is a portion of the capacitor element body 1. Hence, the first inner electrode 21 and third inner electrode 25 have an overlapping area therebetween when seen in the opposing direction of the first and second main faces 2, 3. In the insulator layers 9, the portion overlapping the main electrode portion 22 of the first inner electrode 21 and the main electrode portion 26 of the third inner electrode 25 is an area substantially generating one capacitance component.

As also shown in (a) of FIG. 4, the second inner electrode 31 exhibits a rectangular form, and has a main electrode portion 32 and a lead portion 33. The main electrode portion 32 and lead portion 33 are formed integrally with each other. The lead portion 33 extends from an edge of the main electrode portion 32 on the second side face 5 side so as to expose an end at the second side face 5.

The second terminal electrode 12 is formed such as to cover the whole exposed portion of the lead portion 33 on the second side face 5. The lead portion 33 is connected to the second terminal electrode 12 physically and electrically. As a consequence, the second inner electrode 31 is connected to the second terminal electrode 12.

As also shown in (b) of FIG. 4, the fourth inner electrode 35 has a main electrode portion 36 exhibiting a rectangular form and two lead portions 37. The main electrode portion 36 is integrally formed with the lead portions 37. One lead portion 37 extends from an end portion of the main electrode portion 36 on the first side face 4 side to the third side face 6 so as to expose an end at the third side face 6. The other lead portion 37 extends from an end portion of the main electrode portion 36 on the first side face 4 side to the fourth side face 7 so as to expose an end at the fourth side face 7.

The third and fourth terminal electrodes 13, 14 are formed such as to cover all the exposed portions of the lead portions 37 on the third and fourth side faces 6, 7, respectively. The lead portions 37 are connected to their corresponding third and fourth terminal electrodes 13, 14 physically and electrically. As a consequence, the fourth inner electrode 35 is connected to the third and fourth terminal electrodes 13, 14.

The main electrode portion 32 of the second inner electrode 31 and the main electrode portion 36 of the fourth inner electrode 35 include respective areas opposing each other in the laminating direction of the insulator layers 9 (the opposing direction of the first and second main faces 2, 3) while interposing therebetween at least one insulator layer 9 which is a portion of the capacitor element body 1. Hence, the second inner electrode 31 and fourth inner electrode 35 have an overlapping area therebetween when seen in the opposing direction of the first and second main faces 2, 3. In the insulator layers 9, the portion overlapping the main electrode portion 32 of the second inner electrode 31 and the main electrode portion 36 of the fourth inner electrode 35 is an area substantially generating one capacitance component.

The first and second inner electrodes 21, 31 are arranged at respective positions (layers) different from each other in the opposing direction of the first and second main faces 2, 3 and in the opposing direction of the first and second side faces 4, 5. Hence, within the capacitor element body 1, the first and second inner electrodes 21, 31 are arranged with a gap therebetween extending in the opposing direction of the first and second main faces 2, 3 and in the opposing direction of the first and second side faces 4, 5.

The third and fourth inner electrodes 25, 35 are arranged at respective positions (layers) different from each other in the opposing direction of the first and second main faces 2, 3 and in the opposing direction of the first and second side faces 4, 5. Hence, within the capacitor element body 1, the third and fourth inner electrodes 25, 35 are arranged with a gap therebetween extending in the opposing direction of the first and second main faces 2, 3 and in the opposing direction of the first and second side faces 4, 5.

The first and fourth inner electrodes 21, 35 are arranged at the same position (layer) in the opposing direction of the first and second main faces 2, 3 while having a predetermined gap therebetween in the opposing direction of the first and second side faces 4, 5. The second and third inner electrodes 31, 25 are arranged at the same position (layer) in the opposing direction of the first and second main faces 2, 3 while having a predetermined gap therebetween in the opposing direction of the first and second side faces 4, 5.

As a consequence, the first inner electrode 21 has no areas overlapping the second and fourth inner electrodes 31, 35 when seen in the opposing direction of the first and second main faces 2, 3. The third inner electrode 25 has no areas overlapping the second and fourth inner electrodes 31, 35 when seen in the opposing direction of the first and second main faces 2, 3. The lead portions 27 of the third inner electrode 25 have no areas overlapping or opposing the lead portions 37 of the fourth inner electrode 35 when seen in the opposing direction of the first and second main faces 2, 3.

As shown in FIG. 5, capacitors C11, C12 are formed in the respective inner electrode groups in the multilayer capacitor C1. The capacitor C11 is formed by the areas where the main electrode portion 22 of the first inner electrode 21 and the main electrode portion 26 of the third inner electrode 25 oppose each other. The capacitor C12 is formed by the areas where the main electrode portion 32 of the second inner electrode 31 and the main electrode portion 36 of the fourth inner electrode 35 oppose each other. As shown in FIG. 5, the first and second terminal electrodes 11, 12 are connected to signal transmission lines SL (e.g., differential transmission lines), while the third and fourth terminal electrodes 13, 14 are connected to ground lines GL, whereby the multilayer capacitor C1 is mounted to another component. In this case, the first and second terminal electrodes function as signal terminal electrodes, while the third and fourth terminal electrodes function as grounding terminal electrodes.

As in the foregoing, this embodiment realizes the multilayer capacitor C1 in which two capacitors C11, C12 are formed within the single capacitor element body 1. The third and fourth terminal electrodes 13, 14 are shared by the two capacitors C11, C12. These can further reduce the size of the multilayer capacitor C1. The multilayer capacitor C1 is made smaller, and thus can be mounted between two transmission lines such as differential transmission lines when inserted therebetween.

In this embodiment, the first and third inner electrodes 21, 25 constituting one capacitor C11 are arranged such as to have no overlapping areas with, i.e., not to overlap, the second and fourth inner electrodes 31, 35 forming the other capacitor C12 when seen in the opposing direction of the first and second main faces 2, 3. This can restrain crosstalk from occurring between the two capacitors C11, C12. In particular, the first and second inner electrodes 21, 31 are arranged at respective positions different from each other in the opposing direction of the first and second main faces 2, 3 and in the opposing direction of the first and second side faces 4, 5, while the third and fourth inner electrodes 25, 35 are arranged at respective positions different from each other in the opposing direction of the first and second main faces 2, 3 and in the opposing direction of the first and second side faces 4, 5. As a consequence, the gap between the first and second inner electrodes 21, 31 and the gap between the third and fourth inner electrodes 25, 35 are made greater, whereby the occurrence of crosstalk can further be suppressed.

In this embodiment, the first and fourth inner electrodes 21, 35 are arranged on the same layer, while the second and third inner electrodes 31, 25 are arranged on the same layer. This reduces the total number of inner electrodes laminated for yielding a desirable capacitance in the resulting capacitors C11, C12, whereby the multilayer capacitor C1 (capacitor element body 1) can achieve a lower profile.

Figure 6:
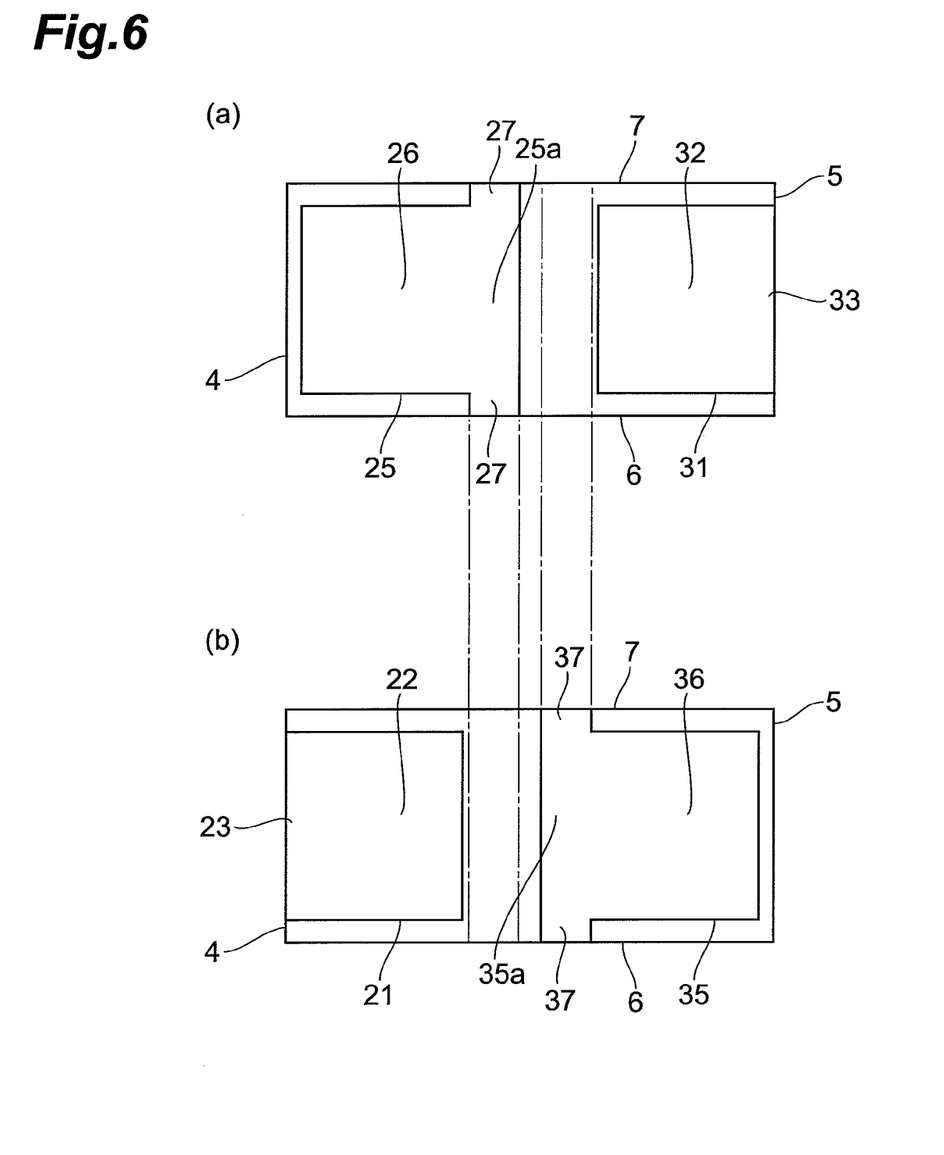
FIG. 6 is a view showing structures of inner electrodes in accordance with a modified example of the embodiment.

A modified example of the first to fourth inner electrodes will now be explained with reference to FIG. 6. FIG. 6 is a view showing structures of inner electrodes in accordance with the modified example.

As shown in (b) of FIG. 6, an edge of the first inner electrode 21 on the second side face 5 side is positioned closer to the first side face 4 than are the two lead portions 27 of the third inner electrode 25 when seen in the opposing direction of the first and second main faces 2, 3. Hence, when seen in the opposing direction of the first and second main faces 2, 3, the first inner electrode 21 does not overlap an area 25a positioned between the two lead portions 27 in the third inner electrode 25 in the opposing direction of the third and fourth side faces 6, 7.

As shown in (a) of FIG. 6, an edge of the second inner electrode 31 on the first side face 4 side is positioned closer to the second side face 5 than are the two lead portions 37 of the fourth inner electrode 35 when seen in the opposing direction of the first and second main faces 2, 3. Hence, when seen in the opposing direction of the first and second main faces 2, 3, the second inner electrode 31 does not overlap an area 35a positioned between the two lead portions 37 in the fourth inner electrode 35 in the opposing direction of the third and fourth side faces 6, 7.

The gap between the first and second inner electrodes 21, 31 is made much greater in the modified example. This can suppress the occurrence of crosstalk more effectively.

Though a preferred embodiment of the present invention is explained in the foregoing, the present invention is not necessarily restricted to the above-mentioned embodiment but can be modified in various ways within the scope not deviating from the gist thereof.

The number of laminations of insulator layers 9 and numbers of laminations of inner electrodes 21, 25, 31, 35 included in the capacitor element body 1 are not limited to those shown in the above-mentioned embodiment and modified example. The forms of the inner electrodes 21, 25, 31, 35 are not limited to those shown in the above-mentioned embodiment and modified example. The area where the main electrode portion 22 of the first inner electrode 21 and the main electrode portion 26 of the third inner electrode 25 oppose each other may have a size different from that of the area where the main electrode portion 32 of the second inner electrode 31 and the main electrode portion 36 of the fourth inner electrode 35 oppose each other.

The first and fourth inner electrodes 21, 35 are not required to be arranged on the same layer, but may be arranged at respective positions (layers) different from each other in the opposing direction of the first and second main faces 2, 3. The second and third inner electrodes 31, 25 are not required to be arranged on the same layer, but may be arranged at respective positions (layers) different from each other in the opposing direction of the first and second main faces 2, 3.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:

a capacitor element body having rectangular first and second main faces opposing each other, first and second side faces extending in a short side direction of the first and second main faces so as to connect the first and second main faces to each other and opposing each other, and third and fourth side faces extending in a longer side direction of the first and second main faces so as to connect the first and second main faces to each other and opposing each other, the capacitor element body including a plurality of insulator layers laminated in the opposing direction of the first and second main faces;

a first terminal electrode arranged on the first side face of the capacitor element body;

a second terminal electrode arranged on the second side face of the capacitor element body;

a third terminal electrode arranged on the third side face of the capacitor element body;

a fourth terminal electrode arranged on the fourth side face of the capacitor element body;

a first inner electrode connected to the first terminal electrode and arranged within the capacitor element body;

a second inner electrode connected to the second terminal electrode and arranged within the capacitor element body; and third and fourth inner electrodes connected to the third and fourth terminal electrodes and arranged within the capacitor element body;

wherein the first and second inner electrodes have no overlapping area therebetween when seen in the opposing direction of the first and second main faces and are arranged at respective positions different from each other in the opposing direction of the first and second main faces and in the opposing direction of the first and second side faces;

wherein the third and fourth inner electrodes have no overlapping area therebetween when seen in the opposing direction of the first and second main faces and are arranged at respective positions different from each other in the opposing direction of the first and second main faces and in the opposing direction of the first and second side faces;

wherein the first and third inner electrodes have an overlapping area therebetween when seen in the opposing direction of the first and second main faces; and wherein the second and fourth inner electrodes have an overlapping area therebetween when seen in the opposing direction of the first and second main faces.

2. A multilayer capacitor according to claim 1, wherein the first and fourth inner electrodes are arranged at the same position in the opposing direction of the first and second main faces while having a predetermined gap therebetween in the opposing direction of the first and second side faces; and wherein the second and third inner electrodes are arranged at the same position in the opposing direction of the first and second main faces while having a predetermined gap therebetween in the opposing direction of the first and second side faces.

3. A multilayer capacitor according to claim 2, wherein the third inner electrode has two lead portions extending from an end portion on the second side face side to the third and fourth side faces, respectively;

wherein the fourth inner electrode has two lead portions extending from an end portion on the first side face side to the third and fourth side faces, respectively;

wherein the first inner electrode is kept from overlapping an area positioned between the two lead portions in the third inner electrode in the opposing direction of the third and fourth side faces when seen in the opposing direction of the first and second main faces; and wherein the second inner electrode is kept from overlapping an area positioned between the two lead portions in the fourth inner electrode in the opposing direction of the third and fourth side faces when seen in the opposing direction of the first and second main faces.

4. A multilayer capacitor according to claim 1, wherein the third inner electrode has two lead portions extending from an end portion on the second side face side to the third and fourth side faces, respectively;

wherein the fourth inner electrode has two lead portions extending from an end portion on the first side face side to the third and fourth side faces, respectively;

wherein the first inner electrode is kept from overlapping an area positioned between the two lead portions in the third inner electrode in the opposing direction of the third and fourth side faces when seen in the opposing direction of the first and second main faces; and wherein the second inner electrode is kept from overlapping an area positioned between the two lead portions in the fourth inner electrode in the opposing direction of the third and fourth side faces when seen in the opposing direction of the first and second main faces.

\* \* \* \* \*